(12) United States Patent
Kim et al.

(10) Patent No.: US 10,883,409 B2
(45) Date of Patent: Jan. 5, 2021

(54) METHOD FOR REGENERATING EXHAUST GAS FILTER FOR VEHICLE

(71) Applicants: Hyundai Motor Company, Seoul (KR); KIA Motors Corporation, Seoul (KR)

(72) Inventors: Yong Sik Kim, Suwon-si (KR); Soung Jae Hyun, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 113 days.

(21) Appl. No.: 16/208,864

(22) Filed: Dec. 4, 2018

(65) Prior Publication Data

US 2020/0011226 A1    Jan. 9, 2020

(30) Foreign Application Priority Data

Jul. 6, 2018    (KR) .......................... 10-2018-0078487

(51) Int. Cl.
*F01N 9/00* (2006.01)
*F01N 3/023* (2006.01)
*F02D 41/02* (2006.01)

(52) U.S. Cl.
CPC ............. *F01N 9/002* (2013.01); *F01N 3/023* (2013.01); *F02D 41/029* (2013.01); *F02D 2200/08* (2013.01)

(58) Field of Classification Search
CPC ............. F01N 3/023; F01N 2900/1606; F02D 2200/0812
See application file for complete search history.

(56) References Cited

U.S. PATENT DOCUMENTS

| | | | |
|---|---|---|---|
| 2011/0072802 A1* | 3/2011 | Bidner | F01N 9/002 60/287 |
| 2013/0255236 A1* | 10/2013 | Ishii | F02D 41/029 60/297 |
| 2018/0334977 A1* | 11/2018 | Hattar | F02D 41/0245 |

* cited by examiner

*Primary Examiner* — Jonathan R Matthias
(74) *Attorney, Agent, or Firm* — Brinks Gilson & Lione

(57) ABSTRACT

A method for regenerating an exhaust gas filter for a vehicle includes the steps of confirming and monitoring the current remaining amount of soot based on information on the initial amount of soot and information on the removal amount of soot during the execution of the service regeneration control mode, comparing the current remaining amount of soot with a predetermined target remaining amount in the condition in which the time accumulated and counted after the execution of the service regeneration control mode does not reach a predetermined first allowable time, and maintaining the execution of the service regeneration control mode until the remaining amount of soot reaches the target remaining amount in the condition that the accumulated and counted time does not reach the first allowable time when the current remaining amount of soot exceeds the target remaining amount.

17 Claims, 5 Drawing Sheets

METHOD FOR REGENERATING EXHAUST GAS FILTER FOR VEHICLE

CROSS-REFERENCE TO RELATED APPLICATION

This application claims priority to and the benefit of Korean Patent Application No. 10-2018-0078487, filed on Jul. 6, 2018, which is incorporated herein by reference in its entirety.

FIELD

The present disclosure relates to a method for regenerating an exhaust gas filter for a vehicle, and more particularly, to a method for regenerating a filter for collecting and removing a particulate matter in exhaust gas discharged from a vehicle engine.

BACKGROUND

The statements in this section merely provide background information related to the present disclosure and may not constitute prior art.

Generally, a purifier for purifying exhaust gas of a vehicle engine is for reducing carbon monoxide (CO), hydrocarbons (HC), Particulate Matter (PM), nitrogen oxides (NOx) that are pollutants contained in the exhaust gas.

As the exhaust gas purifier for a vehicle, a Diesel Oxidation Catalyst (DOC), a Diesel Particulate Filter (DPF), a Gasoline Particulate Filter (GPF), a Selective Catalyst Reduction (SCR), a Lean NOx Trap (LNT), etc. are known. Among them, the Gasoline Particulate Filter (GPF) is used for a gasoline engine, and is a filter for collecting and removing a particulate matter in the exhaust gas discharged after combustion in a gasoline engine.

Recently, a Gasoline Direct Injection (GDI) engine for directly injecting fuel into a cylinder among gasoline engines is widely used according to the trend of high output and high efficiency of the engine. In a TGDI engine applying a turbocharger to the GDI engine in addition to the GDI engine, we have discovered that the generation of particulate matter is occurred and increased due to an increase in the incomplete combustion section in a combustion chamber.

Accordingly, due to the increased particulate matter, a gasoline particulate filter (hereinafter referred to as 'GPF') similar to a diesel particulate filter (hereinafter referred to as 'DPF') used in a diesel engine are actively being developed. As known, in DPF and GPF during the operation of a vehicle, filter regeneration for intermittently or continuously combusting and removing the particulate matter collected by the filter is performed, and the GPF usually combusts soot by natural regeneration unlike the DPF.

The particulate matter is mainly composed of carbon that is not bonded to oxygen because it is not thermally decomposed during combustion of the engine, and the particulate matter such as carbon accumulated in the GPF, that is, soot reacts with oxygen in the exhaust gas at a high temperature condition (e.g., 550□ or more) to generate heat through an oxidation process (i.e., a combustion process).

Since the heat thus generated is proportional to the amount of soot, when the amount of soot exceeds a certain threshold value, that is, when regeneration occurs in an excessive acid state, physical damage such as crack or melting is occurred in the GPF. Accordingly, it is desired to control the amount of soot in the GPF not to exceed the certain threshold value, and one control mode of the first-stage and second-stage regeneration control modes is executed according to the normal amount of the soot. That is, the active regeneration control of the first stage is performed in the vehicle, and the service regeneration control of the second stage is performed when the regeneration is not successful in the first stage.

The active regeneration control mode of the first stage is executed when the soot in the GPF is not completely combusted with the driver's operation condition and thereby a certain amount or more of the soot is accumulated in the GPF, and usually, one of the two controls is applied thereto.

Accordingly, both the temperature rise control such as the engine ignition timing retardation for raising the filter temperature to a certain temperature at which the filter regeneration can be performed and the air-fuel ratio control for supplying oxygen are performed together, or the air-fuel ratio lean control for supplying oxygen is performed alone.

Hereinafter, the filter regeneration means regenerating the filter by combusting (i.e., oxidizing) and removing the soot collected in the filter.

The service regeneration control mode of the second stage is executed when the filter regeneration is not successful in the active regeneration control condition of the first stage and a larger amount of soot than the threshold amount of soot determined in the first stage is accumulated.

The service regeneration control allows a driver to bring a vehicle into a service center so that a professional engineer can reproduce the filter (i.e., GPF), and two controls are performed when instructing a service control through a diagnostic unit after bringing it to the service center. Accordingly, the service regeneration control is performed in the idle stop state, and in this time, the temperature rise control for performing the engine ignition timing retardation for raising the filter temperature to a temperature at which the filter regeneration can be performed and the air-fuel ratio lean control for supplying oxygen are performed.

FIG. 1 is a flowchart illustrating a known service regeneration control process, and as illustrated, after confirming a communication between a vehicle and a service diagnostic device S1, a service regeneration control is executed when a regeneration execution command is input from the service diagnostic device to a controller in a vehicle S2, S3.

In this time, the temperature rise control for controlling an engine revolutions per minute (RPM) by a predetermined target RPM and performing the engine ignition timing retardation for raising the filter temperature to a certain temperature at which the filter regeneration can be performed, and the air-to-fuel ($\lambda$) lean control for supplying oxygen are performed.

Then, as described above, during the execution of the service regeneration control, the time is accumulated and counted S4, and in this time, when the counted regeneration time reaches a regeneration target time, the service regeneration control ends S5, S6.

Meanwhile, in the conventional service regeneration control logic, the following two problems can occur during the control execution or after the completion of the control.

First, when the regeneration control is performed in the idle stop condition, there can be a problem of heat-damage of the peripheral parts of the filter, and for example, the ignition of peripheral parts or the heat-damage of wirings or parking cables, etc. attached to the filter is known.

Since the filter normally performs the temperature rise control until it reaches about 700° C. for regeneration, the peripheral parts of the filter can be exposed to high temperature, and as the service regeneration time becomes longer, the temperature of the peripheral parts of the filter continuously increases to occur the heat-damage thereon.

There is a problem that when the rise temperature can be lowered to 600~650° C. in order to inhibit the heat-damage, a regeneration speed (soot oxidation and combustion speed) is slow and a regeneration time becomes excessive.

In addition, there is another problem that the possibility of incomplete regeneration can be present when applying the service regeneration.

That is, the exhaust flow in the exhaust pipe shows a flow velocity distribution in which the flow velocity becomes faster from the circular cross-section of the exhaust pipe toward the central portion thereof and the flow velocity becomes slower toward the outer side. This tendency appears in the filter as well as in the exhaust pipe. In addition, the temperature and oxygen supply concentration in the filter also shows the same tendency as the above-mentioned flow velocity distribution.

For this reason, the regeneration state in the filter after the end of the service regeneration control tends to be different in the central portion and the outside portion on the filter cross-section, and in this time, the regeneration of the center portion is completed cleanly, while the remaining amount of the soot is present on the outside portion, thereby causing various problems.

That is, when the remaining amount of soot is present due to incomplete regeneration in the outside portion of the filter, the filer can be exposed to high temperature due to the remaining amount of soot, and particularly, while a vehicle is operated again in the incomplete regeneration state after leaving the service center, the remaining amount of soot on the outside portion of the filter is instantaneously combusted and thereby the outside portion of the filter is exposed to high temperature, resulting in the occurrence of the melting and crack of the filter on that portion when a large amount of oxygen is supplied like fuel-cut.

In addition, when the remaining amount of soot due to the incomplete regeneration is present, a model value error in the service diagnostic device (or the controller in the vehicle) can be caused, and the zero leveling for resetting a soot model value in the controller to "0" after the service regeneration should be performed, but we have found that the remaining amount of the soot that is present in the filter is not actually confirmed.

An error can be possibly caused during the execution of the regeneration control when performing the filter active regeneration control due to the model value error generated in this time, and thereby the filter damage can be occurred.

The above information disclosed in this Background section is only for enhancement of understanding of the background of the present disclosure, and therefore it may contain information that does not form the prior art that is already known to a person of ordinary skill in the art.

SUMMARY

The present disclosure provides a method for regenerating an exhaust gas filter for a vehicle, which can reduce heat-damage of the peripheral parts of the filter that can be caused when the filter is regenerated, and can effectively inhibit cracking and melting of the filter due to the remaining amount of soot upon incomplete regeneration, the occurrence of the model value error in the controller after the service regeneration, the error of the zero leveling thereby, error occurrence and filter damage upon the regeneration, etc.

According to a form of the present disclosure, a method for regenerating an exhaust gas filter for a vehicle includes the steps of confirming an initial amount of soot that is the current amount of soot in the filter when a regeneration execution command is inputted from the vehicle, executing a service regeneration control mode for regenerating the filter by oxidizing the soot in the filter, and calculating a removal amount of soot during the execution of the service regeneration control mode, confirming and monitoring a current remaining amount of soot based on information on the initial amount of soot and information on the calculated removal amount of soot during the execution of the service regeneration control mode, comparing the current remaining amount of soot with a predetermined target remaining amount in the condition in which the time accumulated and counted after the execution of the service regeneration control mode does not reach a predetermined first allowable time, and maintaining the execution of the service regeneration control mode until the remaining amount of soot reaches the target remaining amount in the condition that the accumulated and counted time does not reach the first allowable time when the current remaining amount of soot exceeds the target remaining amount.

In a further aspect of the present disclosure, the method includes the service generation control mode configured for controlling an engine revolutions per minute (RPM) to a predetermined first target RPM, retardingly controlling an engine so that an ignition timing retardation amount becomes a predetermined first retardation amount, and performing an air-to-fuel ratio lean control for the engine so that an air-to-fuel ratio becomes a predetermined first air-to-fuel ratio.

In a further aspect of the present disclosure, the method can further include the steps of executing a heat-damage prevention control mode for inhibiting or preventing the heat-damage of peripheral parts of the filter by lowering filter temperature and reducing the amount of oxygen supplied to the filter, when the current remaining amount of soot exceeds the target remaining amount and the accumulated and counted time reaches the first allowable time during the execution of the service regeneration control mode.

The heat-damage prevention control mode is configured for controlling the engine RPM to a predetermined second target RPM, retardingly controlling an engine so that an ignition timing retardation amount becomes a predetermined second retardation amount, and performing an air-to-fuel ratio control for the engine so that an air-to-fuel ratio becomes a predetermined second air-to-fuel ratio. The second target RPM, the second retardation amount and the second air-to-fuel ratio are set as different values from the predetermined target RPM, retardation amount, and air-to-fuel ratio in the service regeneration control mode, respectively. Furthermore, the second target RPM is set to be lower than the first target RPM of the service regeneration control mode, and the second retardation amount and air-to-fuel ratio are set to be smaller than the predetermined first ignition timing retardation amount and first air-to-fuel ratio in the service regeneration control mode, respectively.

In a further aspect of the present disclosure, the method further includes the steps of comparing a newly counted heat-damage prevention control time with a predetermined second allowable time during the execution of the heat-damage prevention control mode, and resuming the execution of the service regeneration control mode when the heat-damage prevention control time reaches the second allowable time.

In a further aspect of the present disclosure, the method can further include the steps of executing a soot remaining amount complete removal control mode having an engine fuel-cut off control so that the remaining amount of soot in the filter can be additionally removed, when the remaining amount of soot is reduced to reach the target remaining amount during the execution of the service regeneration control mode. The soot remaining amount complete removal control mode is executed after a predetermined delay time elapses when the remaining amount of soot is reduced to reach the target remaining amount during the execution of the service regeneration control mode, and configured for retardingly controlling an engine so that an ignition timing retardation amount becomes a predetermined third retardation amount, and controlling the engine in a fuel-cut state after increasing an engine revolutions per minute (RPM) along a predetermined slope until the engine RPM reaches a predetermined third target RPM.

The third retardation amount is set to be smaller than a first retardation amount. The engine is controlled in the fuel-cut state until the engine RPM reaches a predetermined fourth target RPM. In addition, the third target RPM is set to be higher than a first target RPM, and the fourth target RPM is set to be lower than the first target RPM and higher than a second target RPM.

In a further aspect of the present disclosure, the soot remaining amount complete removal control mode maintains the engine RPM to the third target RPM during a predetermined first maintenance time when the engine RPM reaches the third target RPM, and the engine RPM to the fourth target RPM during a predetermined second maintenance time when the engine RPM reaches the fourth target RPM by controlling the engine in the fuel-cut state. In addition, the soot remaining amount complete removal control mode repeats a process for controlling the engine in the fuel-cut state by a predetermined number of times until the engine RPM reaches the fourth target RPM after the engine RPM reaches the third target RPM. A throttle opening amount is increased to a predetermined target value of the opening amount while an engine is controlled in a fuel-cut state in the performing the soot remaining amount complete removal control mode.

In a further aspect of the present disclosure, the exhaust gas filter is a gasoline particulate matter filter for collecting and removing particulate matter in the exhaust gas discharged from a gasoline engine.

In addition, it is possible to completely remove the remaining amount of soot after the service regeneration control through the sequential execution of the service regeneration control mode, the heat-damage prevention control mode, and the soot remaining amount complete removal control mode, and as a result, to effectively inhibits cracking and melting of the filter due to the remaining amount of soot upon incomplete regeneration, the occurrence of the model value error in the controller after the service regeneration, the error of the zero leveling thereby, error occurrence and filter damage upon the regeneration, etc.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
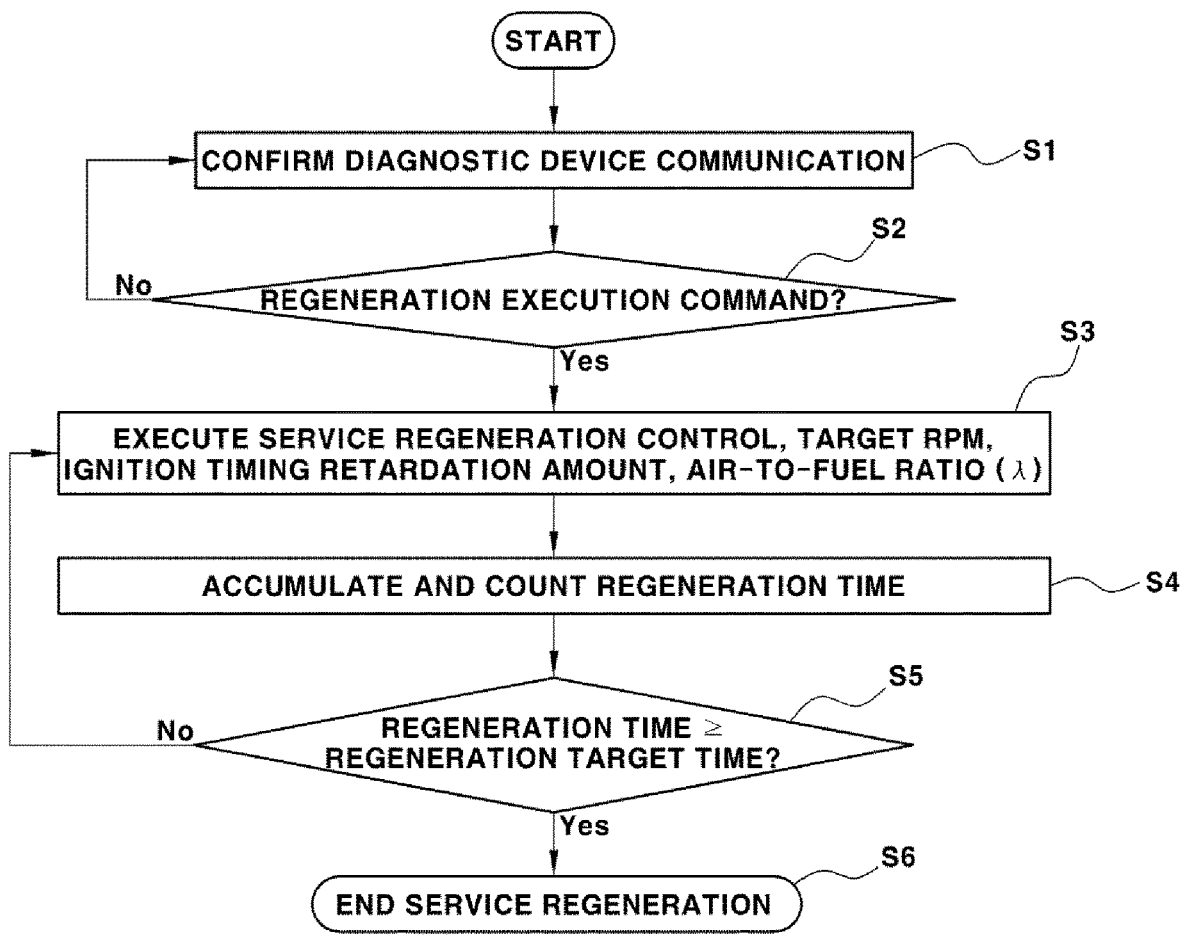
FIG. 1 is a flowchart illustrating the conventional service regeneration process.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Throughout the specification, when a certain portion "includes" a certain component, this means that the other components are excluded, but can be further included unless specially described otherwise.

The present disclosure provides a method for regenerating an exhaust gas filter in a vehicle for inhibiting heat-damage of the peripheral parts of the filter that can occur upon regeneration of the filter.

In addition, the present disclosure also provides a method for regenerating an exhaust gas filter for a vehicle, which can effectively inhibit cracking and melting of the filter due to the remaining amount of soot upon incomplete regeneration, the occurrence of the model value error in the service diagnostic device (or the controller in the vehicle) after the service regeneration, and the error of the zero leveling thereby, error occurrence and filter damage upon the regeneration, etc.

In the present disclosure, the exhaust gas filter can be a Gasoline Particulate matter Filter (GPF). The present disclosure can be provided with a method for regenerating a Gasoline Particulate matter Filter (GPF) for collecting and removing particulate matter contained in the exhaust gas discharged after combustion from an engine mounted on a gasoline vehicle such as a gasoline engine.

First, the present disclosure includes a heat-damage prevention control process (a heat-damage prevention control mode) for inhibiting the heat-damage of the peripheral parts of the filter that can occur upon the regeneration of the filter (GPF).

As an improved filter regeneration method, in order to inhibit the heat-damage of the peripheral parts of the filter, the present disclosure maintains the rise temperature of the filter as a 700° C. level, limits the application time (the regeneration time) of the service regeneration control mode within the allowable time not causing the heat-damage problem, and applies a cooling time during a certain time by the heat-damage prevention control mode after the service is regenerated and then repeats the service regeneration again.

Accordingly, the present disclosure alternately performs the service regeneration and the cooling for heat-damage prevention instead of continuously maintaining the rise temperature of the filter until the regeneration is completed, and is applied with a service regeneration division control concept that divides the service regeneration for removing soot and regenerating the filter into multiple times to sequentially perform them together with the intermediate cooling process.

For example, it is possible to proceed in the order of performing the first service regeneration (10 minutes)→performing the cooling mode for inhibiting the heat-damage (10 minutes)→performing the second service regeneration (10 minutes), and a separate control such as the downgrade of the revolutions per minute (RPM), the retardation amount of the ignition timing, the reduction in the air-fuel ratio, etc. can be applied as compared to a normal service regeneration control mode ('a service regeneration control mode' that will be described later) when it is entered into a cooling mode ('a heat-damage prevention control mode' that will be described later).

In the present disclosure, the cooling mode for inhibiting the heat-damage (the heat-damage prevention control mode) is a mode for inhibiting the heat-damage of the peripheral parts of the filter, and is a mode for lowering the filter temperature and reducing the amount of oxygen supplied to the filter compared to the service regeneration control (the service regeneration control mode).

According to a form of the present disclosure, when the remaining amount of soot due to the incomplete regeneration is present, that is, the problem causing crack or melting in the filter exposed to high temperature due to the remaining amount of soot, and the problem causing a model value error in a service diagnostic device due to the remaining amount of soot and thereby an error of the zero leveling and an error and filter damage upon regeneration, etc., the present disclosure additionally performs the process for additionally removing soot that is present in the filter after completion of the service regeneration, more specifically, the process for completely removing the remaining amount of soot (the soot remaining amount complete removal control mode).

The main factors for determining the regeneration speed of the filter (i.e., the GPF) are filter temperature and oxygen concentration, and the filter temperature upon performing the service regeneration normally reaches the oxidizable temperature of the soot.

Accordingly, when the oxygen supply amount upon performing the regeneration is increased, the regeneration speed of the filter can be increased, thereby enabling complete regeneration.

As a method for increasing the oxygen supply amount, when the engine fuel-cut is applied, the oxygen concentration is greatly increased by a certain level or more, and when a throttle valve is further opened during such a fuel-cut (increasing the opening amount of the throttle), an increase in flux (oxygen supply=oxygen concentration×exhaust amount) and an increase in a fuel-cut time can be implemented.

In addition, since a customer's vehicle cannot be operated in the service center, the soot complete removal control mode including the fuel-cut control has to be performed during the idle stop, as described later, but the long-time fuel-cut cannot be applied.

Figure 2:
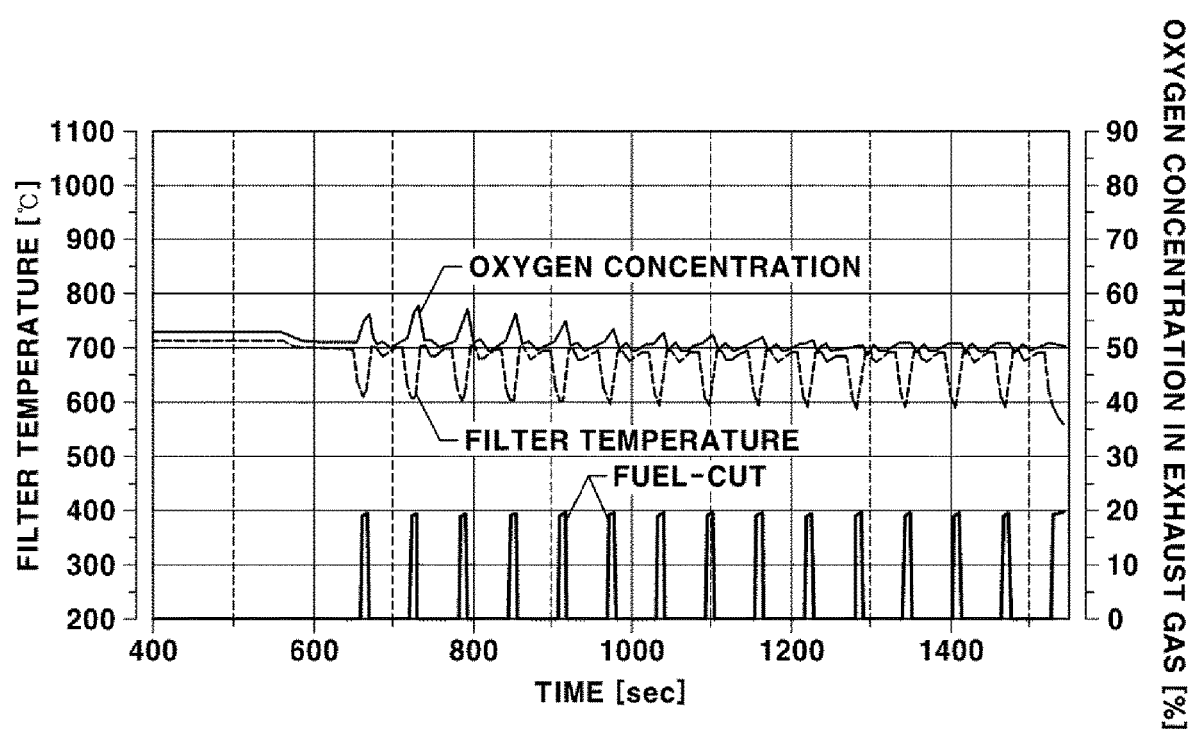
FIG. 2 is a diagram illustrating the state in which fuel-cut is repeatedly performed in a filter regeneration process in accordance with the present disclosure.

Accordingly, the fuel-cut has to be performed after increasing the engine RPM to a certain level, and the amount of soot that can be regenerated during one-time engine fuel-cut duration is limited, such that the fuel-cut is repeatedly performed as illustrated in FIG. 2.

FIG. 2 illustrates that the fuel-cut for about 5 seconds is repeated 15 times, and the oxygen concentration increases during the fuel-cut.

Accordingly, when the fuel-cut is repeatedly performed during the idle stop, it is possible to inhibit the remaining amount of soot left after the service regeneration from being oxidized at the same time, and as a result, when the fuel-cut is repeated by a certain number of times, the remaining amount of soot can be completely removed.

Through this process, a zero leveling can be performed for resetting the soot model value stored in the service diagnostic device (or the controller in the vehicle) to "0" after completely removing the remaining amount of soot in the filter (GPF).

According to a form of the present disclosure, the above-described heat-damage prevention control process can be varied depending on the situation of each vehicle or each engine.

That is, in some vehicle types, the heat-damage prevention control mode cannot be desired because the heat-damage problem does not occur, but the heat-damage prevention control mode can be desired for other vehicle types. In addition, the service regeneration time is various for each vehicle type, and the heat-damage prevention time also can be various for each vehicle type.

However, in the service site, it is not possible to individually configure the regeneration control process for each vehicle type or each engine, and accordingly, consider each requirement and service site situation in terms of simplifying the service task and simplifying the method. Accordingly, It is preferable to configure the service regeneration control, the heat-damage prevention control, and the soot remaining amount complete removal control mode as an integrated control mode (hereinafter, referred to as 'integrated regeneration control mode').

Accordingly, the present disclosure integrally constitutes the service regeneration control mode, the heat-damage prevention control mode, and the soot remaining amount complete removal control mode so that the operator can collectively perform and complete the above-described processes in the integrated regeneration control mode by one-time simple operation in the service part.

However, in the heat-damage prevention control mode, it is preferable to be selectively executed depending upon the situation, and as will be described later. Although the time (the regeneration time) of the service regeneration control mode has reached a predetermined allowable time (a first allowable time), it is performed on when the remaining amount of soot does not reach the target remaining amount thereof.

Figure 3:
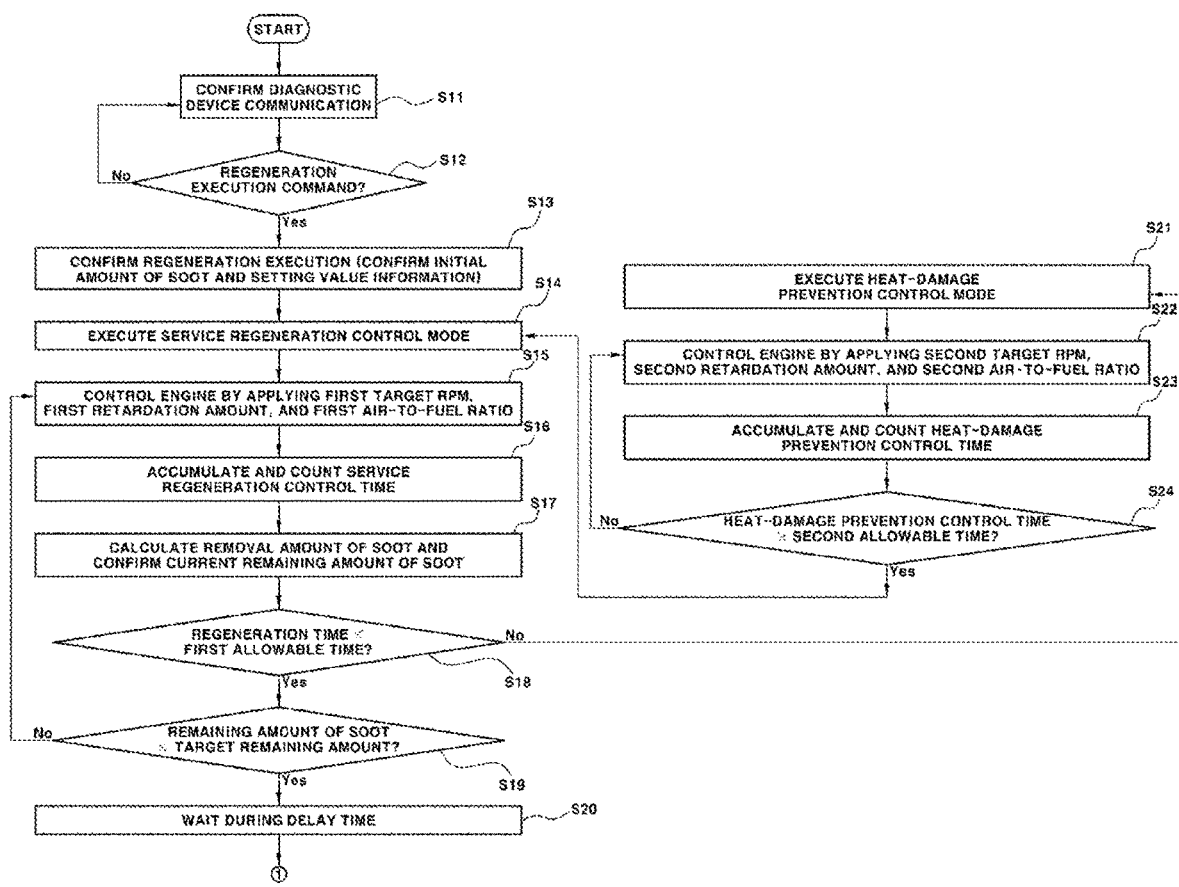
FIGS. 3 and 4 are flowcharts illustrating a method for regenerating a filter in accordance with a form of the present disclosure.

Accordingly, the heat-damage prevention control mode is executed only when 'No' in S18 of FIG. 3 is outputted, which will be described later, and when 'Yes' in S18 and 'Yes' in S19 of FIG. 3 are outputted, which will be described later, the service regeneration control mode is not executed.

In addition, an improved integrated regeneration control mode can be executed according to the individual situation using a setting value such as application conditions or the time for each control mode for the vehicle type and the engine type based on the integrated regeneration control mode.

When the type of the vehicle whose filter is to be regenerated is a vehicle that is free from the risk of the heat-damage occurrence of peripheral parts thereof, the operator of the service center can automatically inhibit the heat-damage prevention control mode from being executed when inputting the corresponding vehicle type through the service diagnostic device.

Accordingly, in the vehicle type that is determined to be free from the risk of heat-damage occurrence, it can be set in the service diagnostic device so that only the service regeneration control mode and the soot remaining amount complete removal control mode, which will be described later, are executed.

In describing a transition process for each mode, the amount of soot at the beginning of service regeneration can be varied depending on how much more the customer has traveled after the GPF warning light flashes upon bringing the vehicle for the service regeneration control.

Generally, it is not possible to check how much the soot remains after performing the service regeneration only by a certain service regeneration control time. In this case, if the fuel-cut control is immediately applied, an apparatus and parts including the filter can be damaged. Accordingly, in this situation, it is preferable to execute the fuel-cut control mode for completely removing soot when the remaining amount of soot reduces to a certain level or less during the service regeneration control.

In addition, it is preferable to execute the heat-damage prevention control mode because the heat-damage problem can occur when the remaining amount of soot does not reduce to a certain level or less even after the service regeneration control allowable time has elapsed.

In addition, it is preferable to execute the service regeneration control mode again when the exhaust system temperature is reduced by applying the heat-damage prevention control mode during a certain time.

Hereinafter, the filter regeneration process in accordance with a form of the present disclosure will be described in more detail with reference to FIGS. 3 to 5.

Figure 4:
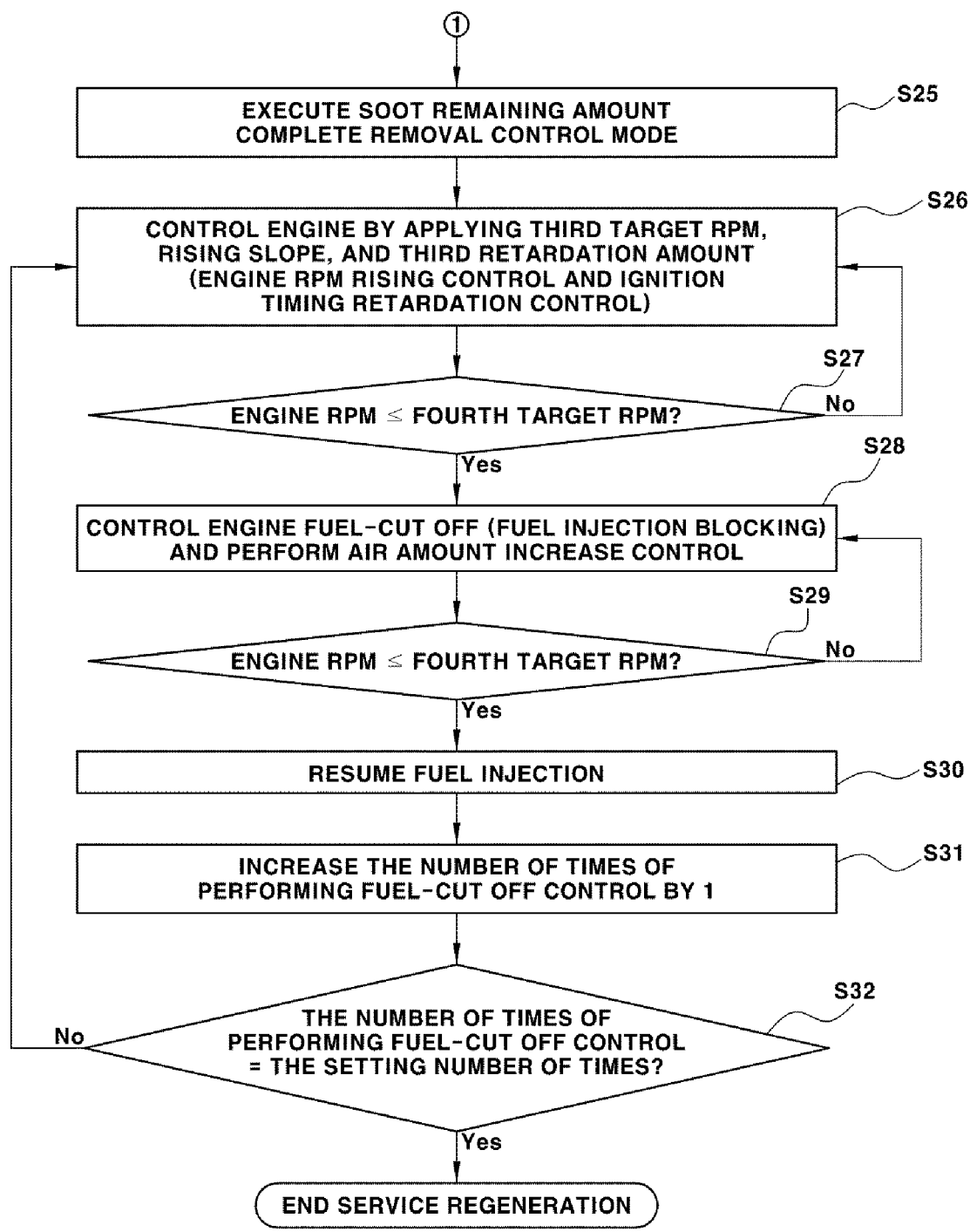
Figure 5:
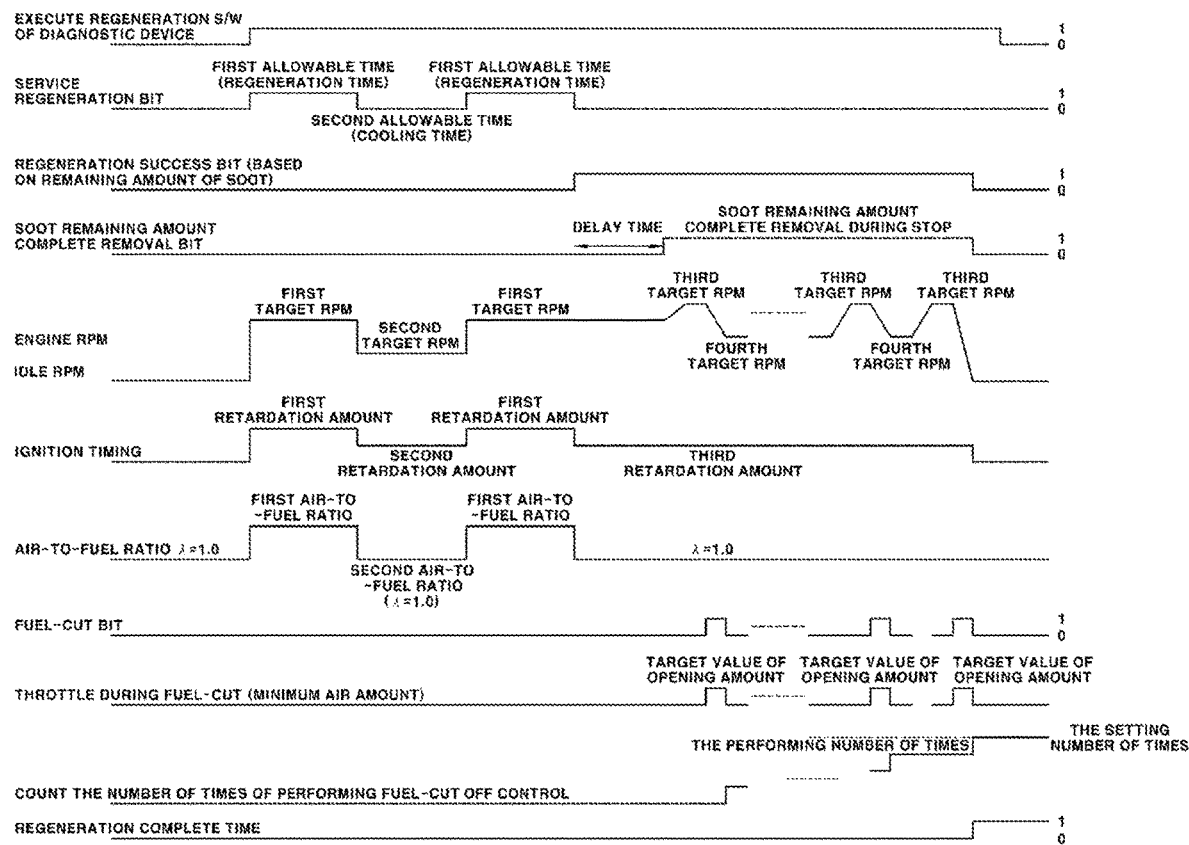
FIG. 5 is a diagram illustrating a control timing chart in the filter regeneration process in accordance with a form of the present disclosure.

FIGS. 3 and 4 are flowcharts illustrating a method for regenerating a filter in accordance with a form of the present disclosure, and FIG. 5 is a diagram illustrating a control timing chart of a filter regeneration process in accordance with a form of the present disclosure.

When the vehicle is brought into the service center for the service regeneration of the filter, the operator communicably connects the service diagnostic device to the vehicle. As described above, when the service diagnostic device is connected to the vehicle, the controller in the vehicle and the service diagnostic device communicate with each other to check that they are communicably connected to each other like the normal service regeneration S11.

When the operator performs a predetermined operation for the regeneration execution in the service diagnostic device after confirming that the communication connection has been made through the service diagnostic device, the service diagnostic device inputs the regeneration execution command to the controller in the vehicle according to the operator's performance.

In this stage, the operator can input and select the vehicle type or the engine type of the current vehicle connected for the filter regeneration through a predetermined operation process in the service diagnostic device.

When the operator inputs the vehicle type or the engine type into the service diagnostic device before the regeneration is performed, the service diagnostic device determines and selects the setting values depending upon the vehicle type or the engine type input by the operator from the setting data such as map data.

In addition, when the service diagnostic device inputs the regeneration execution command to the controller in the vehicle, the controller in the vehicle also confirms whether the regeneration execution command is inputted in addition to the service diagnostic device S12 to confirm that the operation for the service regeneration has been performed by the operator, and also confirms that the service regeneration has been started by the performance of the operator (confirming the service regeneration execution) S13.

In this stage, it can be set so that the controller in the vehicle delivers to and shares with the service diagnostic device for the current soot amount information of the filter, which is detected and acquired through a sensor. In addition, the initial soot amount information is detected and acquired through the sensor, and the controller in the vehicle and the service diagnostic device shares previous regeneration history information of the corresponding vehicle, etc. through the communication therebetween.

For example, the service diagnostic device and the controller in the vehicle confirm information such as the previous number of times of soot remaining amount complete removal, that is, the number of previous execution of soot remaining amount complete removal control mode, and deliver to and share with each other the information through the communication therebetween.

Thereafter, the integrated regeneration control mode is executed under the communication and cooperation control between the service diagnostic device and the controller in the vehicle, and in the integrated regeneration control mode, the service regeneration control mode, the heat-damage prevention control mode, and the soot remaining amount complete removal control mode are executed sequentially and collectively according to a predetermined process, logic, and sequence of integrated regeneration control without a separate additional operation of the operator.

As illustrated in FIG. 3, the service regeneration control mode is first executed under the communication and coordination control between the service diagnostic device and the controller in the vehicle S14.

In this stage, the service regeneration control is performed depending upon the setting value information, a predetermined engine target RPM (hereinafter, referred to as 'first target RPM'), an ignition timing retardation amount (hereinafter, referred to as 'first retardation amount'), and an air-to-fuel ratio (hereinafter, referred to as 'first air-to-fuel ratio) of the service regeneration control mode for the corresponding vehicle S15.

The service regeneration control mode controls the engine RPM to the first target RPM, performs the temperature rise control for retarding the ignition timing of the engine by the first retardation amount in order to raise the filter temperature to a temperature at which the filter regeneration can be performed, and performs the air-to-fuel ratio lean control for the engine with the first air-to-fuel ratio set as the air-to-fuel ratio control target value in order to supply sufficient oxygen necessary for regeneration to the filter.

As described above, while the service regeneration control mode is being executed, the time after the start of the service regeneration control mode as the regeneration time (see 'regeneration time' in FIG. 5) is accumulated and counted S16. The removal amount of soot is continuously calculated as time elapses, and at the same time, the current remaining amount of soot is continuously checked and monitored based on the initial amount of soot and the calculated removal amount of soot S17.

Generally, the calculation of the removal amount of soot is a technology that is well known to those skilled in the art, so a detailed description thereof will be omitted.

After starting the service regeneration control mode, it is determined whether the counted regeneration time reaches a predetermined allowable time (hereinafter, referred to as 'first allowable time') of the service regeneration control mode that is the setting value information S18.

Herein, when the regeneration time has reached the first allowable time, the heat-damage prevention control mode is executed S21.

On the other hand, when the regeneration time has not yet reached the first allowable time in S18, the current remaining amount of soot is continuously compared with the target remaining amount that is one of the setting value information S19, and when the remaining amount of soot continuously exceeds the target remaining amount, the execution of the service regeneration control mode is continuously maintained.

However, when the current remaining amount of soot is equal to or smaller than the target remaining amount during the execution of the service regeneration control mode, the soot remaining amount complete removal control mode is executed (moving to S25 of FIG. 4).

In this stage, when the current remaining amount of soot is equal to or smaller than the target remaining amount, after waiting for a predetermined delay time S20, the soot remaining amount complete removal control mode is executed when the delay time has elapsed.

As described above, even if the current remaining amount of soot reaches the target remaining amount during the execution of the service regeneration control mode to satisfy the execution condition of the soot remaining amount complete removal control mode, the soot remaining amount complete removal control mode is not immediately executed, but the soot remaining amount complete removal control mode is executed after the delay time. Herein, the delay time is also one of the setting value information.

When the regeneration time reaches the first allowable time in S18, the execution of the heat-damage prevention control mode is started S21, and in the heat-damage prevention control mode, a target RPM (hereinafter, referred to as 'second target RPM'), an ignition timing retardation amount (hereinafter, referred to as 'second retardation amount'), and an air-to-fuel ratio (hereinafter, referred to as 'second air-to-fuel ratio') are preset as the setting value information.

The second target RPM, the second retardation amount, and the second air-to-fuel ratio as the setting value information in the heat-damage prevention control mode are preset in the service diagnostic device (or the controller in the vehicle), and in the heat-damage prevention control mode as a mode corresponding to the cooling mode described the above, the target RPM is set to be lower than that of the service regeneration control mode, the ignition timing retardation amount is set to be smaller than that of the service regeneration control mode, and the air-fuel ratio is also set to be smaller than that of the service regeneration control mode in order to reduce the oxygen supply amount (the oxygen concentration).

Accordingly, the second target RPM is set to be lower than the first target RPM, and the second retardation amount and the second air-to-fuel ratio (e.g., $\lambda=1$ in FIG. 5) are set to be lower than the first retardation amount and the first air-to-fuel ratio.

When the heat-damage prevention control mode is executed, the heat-damage prevention control mode is executed according to the second target RPM that is a predetermined engine target RPM of the heat-damage prevention control mode for the corresponding vehicle, the second retardation amount that is an ignition timing retardation amount, and the second air-to-fuel ratio that is an air-to-fuel ratio as the setting value information S22.

An engine control for controlling the engine RPM to the second target RPM, controlling by retarding the ignition timing by the second retardation amount, and controlling the air-fuel ratio to the second air-fuel ratio is performed.

In addition, during the execution of the heat-damage prevention control mode as described above, the time after the start of the heat-damage prevention control mode, that is, the heat-damage prevention control time (indicated as 'cooling time' in FIG. 5) is newly accumulated and counted S23.

After that, the counted heat-damage prevention control time is compared with a predetermined allowable time (hereinafter, referred to as 'second allowable time') that is one of the setting value information S24, and when the heat-damage prevention control time elapses the second allowable time, a mode transition is made to switch to the service regeneration control mode after S14 again after ending the heat-damage prevention control mode.

As a result, thereafter, the service regeneration control mode is executed for a re-predetermined regeneration time (i.e., the first allowable time) S14 to S18.

Referring to FIG. 5, it is illustrated that the integrated regeneration control mode in accordance with the present disclosure is executed until the execution of the regeneration software of the service diagnostic device is completed.

In addition, after the service regeneration control mode is executed for the first allowable time (the regeneration time) (a service regeneration bit is '1'), the heat-damage prevention control mode is executed for the second allowable time (the cooling time (the service regeneration bit is '0'), and then the service regeneration control mode is executed again for the first allowable time (the regeneration time) (the service regeneration bit is '1').

In the form of FIG. 5, the service regeneration control mode and the heat-damage prevention control mode are alternately executed, and after one-time service regeneration control mode, the heat-damage prevention control mode is executed, and then one-time service regeneration control mode is further executed.

According to a form of the present disclosure, the service regeneration control mode is executed twice and the heat-damage prevention control mode is executed once, however, it is only an illustrative example, and the service regeneration control and the heat-damage prevention control can be alternately executed for respective predetermined allowable times (the first allowable time and the second allowable time) until the remaining amount of soot is equal to or smaller than the target remaining amount (a regeneration success bit in FIG. 5 becomes '1'), and the number of times of the service regeneration control and the heat-damage prevention control are not limited to twice and once, respectively as described above.

As shown in FIG. 5, the target RPM, the ignition timing retardation amount, and the air-to-fuel ratio for the engine are preset for the service regeneration control mode and the heat-damage prevention control mode, respectively, and the engine is controlled according to the target RPM (first and second target RPMs), the ignition timing retardation amounts (first and second retardation amounts), and the air-to-fuel ratios (first and second air-to-fuel ratios), which are preset, respectively, to execute each control mode for regeneration.

In S19 of FIG. 3, after the remaining amount of soot is equal to or smaller than the target remaining amount to perform successive regeneration, after the delay time elapses, the soot remaining amount complete removal control mode is executed under the communication and cooperation control between the service diagnostic device and the controller in the vehicle S25.

In the soot remaining amount complete removal control mode, target RPMs (hereinafter, referred to as 'third target RPM' and 'fourth target RPM'), a rising slope thereof, and an ignition timing retardation amount (hereinafter, referred to as 'third retardation amount') as the setting value information in the corresponding mode are used S26.

In the soot remaining amount complete removal control mode, a control for gradually increasing the engine RPM along the rising slope until the engine RPM reaches the target third RPM as a target, and simultaneously, retarding the ignition timing retardation amount for the engine to become the third retardation amount is performed S26.

In the present disclosure, the third retardation amount is set to be smaller than the first retardation amount, and can be the same or different from the second retardation amount.

In addition, the third target RPM can be set to be higher than the first target RPM, and the fourth target RPM can be set to be lower than the first target RPM and higher than the second target RPM.

When the engine RPM rises to reach the third target RPM, an engine control for maintaining the engine RPM at the third target RPM during a first maintenance time that is the setting value information, and then after the first maintenance time has elapsed, an engine fuel-cut off control for blocking fuel injection into the engine are performed (see FIG. 5).

The throttle valve is further opened during the engine fuel-cut to perform the air amount increase control for increasing the opening amount of the throttle to a target value of the opening amount that is one of the setting value information.

Accordingly, the engine RPM is gradually lowered again and then is compared with the fourth target RPM that is the setting value information S29, and when the engine RPM reaches the fourth target RPM, the fuel-cut (the fuel injection blocking) off control for the engine is stopped to resume the fuel injection S30, and then the engine RPM is maintained to the fourth target RPM during a second maintenance time that is the setting value information in a fuel injection resumed state.

After the lapse of the second maintenance time, the engine control is configured for gradually increasing the engine RPM along the rising slope until the engine RPM reaches the third target RPM again, and then after the engine RPM is maintained at the third target RPM during the first maintenance time, the fuel-cut off control is configured for the engine until the engine speed reaches the fourth target speed again.

As a result, when reaching the fourth target RPM, the engine RPM is maintained to the fourth target RPM again during the second maintenance time.

In the soot remaining amount complete removal control mode, in addition to the ignition timing retardation control for the engine, the process for increasing the engine RPM to the third target RPM by the predetermined rising slope and then reducing the engine RPM to the fourth target RPM by starting fuel-cut after the first maintenance time, and then maintaining the engine RPM at the fourth target RPM during the second maintenance time is repeated by several times.

In addition, the service diagnostic device and the controller in the vehicle continuously count the number of times of execution of the engine control process including the engine RPM rising control, the fuel-cut off control, and the ignition timing retardation control S31, and when the counted number of times of execution reaches the setting number of times S32, all the filter regeneration processes of the present disclosure, that is, the integrated regeneration control process that is the service regeneration process of the present disclosure performed by the service center for the filter are all ended.

In FIG. 5, during the execution of the engine ignition timing retardation control for controlling the ignition timing retardation amount to the third retardation amount in the soot remaining amount complete removal control mode, the engine RPM rising control (using the third target RPM), the fuel-cut off control (using the fourth target RPM), and the throttle opening amount increase control (using the target value of the opening amount) are repeated by the setting number of times.

In addition, referring to FIG. 5, when the integrated regeneration control process ends, the engine RPM is returned to the initial idle RPM.

While the present disclosure has been described in connection with what is presently considered to be practical exemplary forms, it is to be understood that the present disclosure is not limited to the disclosed forms, but, on the contrary, it is intended to cover various modification and equivalent arrangements included within the spirt and scope of the present disclosure.

What is claimed is:

1. A method for regenerating an exhaust gas filter for a vehicle, the method comprising the steps of:
confirming an initial amount of soot that is a current amount of soot in the filter when a regeneration execution command is inputted from the vehicle;
executing a service regeneration control mode for regenerating the filter by oxidizing the soot in the filter, and calculating a removal amount of soot during the execution of the service regeneration control mode;
confirming and monitoring a current remaining amount of soot based on information on the initial amount of soot and information on the calculated removal amount of soot during the execution of the service regeneration control mode;
comparing the current remaining amount of soot with a predetermined target remaining amount in a condition in which a time accumulated and counted after the execution of the service regeneration control mode does not reach a predetermined first allowable time;
maintaining the execution of the service regeneration control mode until the remaining amount of soot reaches the target remaining amount in the condition that the accumulated and counted time does not reach the first allowable time when the current remaining amount of soot exceeds the target remaining amount; and
executing a heat-damage prevention control mode for inhibiting heat-damage of peripheral parts of the filter by lowering filter temperature and reducing an amount of oxygen supplied to the filter, when the current remaining amount of soot exceeds the target remaining amount and the accumulated and counted time reaches the first allowable time during the execution of the service regeneration control mode.

2. The method of claim 1, wherein the service regeneration control mode is configured for controlling an engine revolutions per minute (RPM) to a predetermined first target RPM,
  retardingly controlling an engine so that an ignition timing retardation amount becomes a predetermined first retardation amount, and
  performing an air-to-fuel ratio lean control for the engine so that an air-to-fuel ratio becomes a predetermined first air-to-fuel ratio.

3. The method of claim 1, wherein the heat-damage prevention control mode is configured for controlling an engine revolutions per minute (RPM) to a predetermined second target RPM,
  retardingly controlling an engine so that an ignition timing retardation amount becomes a predetermined second retardation amount, and
  performing an air-to-fuel ratio control for the engine so that an air-to-fuel ratio becomes a predetermined second air-to-fuel ratio, and
  wherein the second target RPM, the second retardation amount, and the second air-to-fuel ratio are set as different values from the predetermined target RPM, retardation amount, and air-to-fuel ratio in the service regeneration control mode, respectively.

4. The method of claim 3, wherein the second target RPM is set to be lower than a first target RPM of the service regeneration control mode, and the second retardation amount and air-to-fuel ratio are set to be smaller than a predetermined first ignition timing retardation amount and first air-to-fuel ratio in the service regeneration control mode, respectively.

5. The method of claim 1, wherein the method further comprises the steps of:
  comparing a newly counted heat-damage prevention control time with a predetermined second allowable time during the execution of the heat-damage prevention control mode; and
  resuming the execution of the service regeneration control mode when the heat-damage prevention control time reaches the second allowable time.

6. The method of claim 1, wherein the method further comprises the steps of: executing a soot remaining amount complete removal control mode having an engine fuel-cut off control so that the remaining amount of soot in the filter can be additionally removed, when the remaining amount of soot is reduced to reach the target remaining amount during the execution of the service regeneration control mode.

7. The method of claim 6, wherein the soot remaining amount complete removal control mode is executed after a predetermined delay time elapses when the remaining amount of soot is reduced to reach the target remaining amount during the execution of the service regeneration control mode.

8. The method of claim 6, wherein the soot remaining amount complete removal control mode is configured for retardingly controlling an engine so that an ignition timing retardation amount becomes a predetermined third retardation amount, and
  controlling the engine in a fuel-cut state after increasing an engine revolutions per minute (RPM) along a predetermined slope until the engine RPM reaches a predetermined third target RPM.

9. The method of claim 8, wherein the third retardation amount is set to be smaller than a first retardation amount.

10. The method of claim 8, wherein the engine is controlled in the fuel-cut state until the engine RPM reaches a predetermined fourth target RPM.

11. The method of claim 10, wherein the third target RPM is set to be higher than a first target RPM.

12. The method of claim 11, wherein the fourth target RPM is set to be lower than the first target RPM and higher than a second target RPM.

13. The method of claim 10, wherein the soot remaining amount complete removal control mode maintains the engine RPM to the third target RPM during a predetermined first maintenance time when the engine RPM reaches the third target RPM, and
  maintains the engine RPM to the fourth target RPM during a predetermined second maintenance time when the engine RPM reaches the fourth target RPM by controlling the engine in the fuel-cut state.

14. The method of claim 10, wherein the soot remaining amount complete removal control mode repeats a process for controlling the engine in the fuel-cut state by a predetermined number of times until the engine RPM reaches the fourth target RPM after the engine RPM reaches the third target RPM.

15. The method of claim 6, wherein a throttle opening amount is increased to a predetermined target value of the opening amount while an engine is controlled in a fuel-cut state in performing the soot remaining amount complete removal control mode.

16. The method of claim 1, wherein the exhaust gas filter is a gasoline particulate matter filter for collecting and removing particulate matter in the exhaust gas discharged from a gasoline engine.

17. The method of claim 1, wherein the service regeneration control mode and the heat-damage prevention control mode are performed alternatively.

* * * * *